(12) United States Patent
Meksavan et al.

(10) Patent No.: US 10,173,623 B1
(45) Date of Patent: Jan. 8, 2019

(54) SENSOR BRACKET APPARATUS

(71) Applicant: Delta Mobile Systems, Inc, Elgin, IL (US)

(72) Inventors: Boonphet Meksavan, St. Charles, IL (US); Debra A Jones, Schaumburg, IL (US)

(73) Assignee: Delta Mobile Systems, Inc, Elgin, IL (US)

( * ) Notice: Subject to any disclaimer, the term of this patent is extended or adjusted under 35 U.S.C. 154(b) by 381 days.

(21) Appl. No.: 15/002,368

(22) Filed: Jan. 20, 2016

(51) Int. Cl.
*B60R 21/013* (2006.01)
*G01S 13/93* (2006.01)
*B60R 21/01* (2006.01)

(52) U.S. Cl.
CPC .......... *B60R 21/013* (2013.01); *G01S 13/931* (2013.01); *B60R 2021/01013* (2013.01); *G01S 2013/9332* (2013.01); *G01S 2013/9385* (2013.01)

(58) Field of Classification Search
CPC ..... B60R 19/483; B60R 21/013; B62D 25/02; B62D 25/04; G01S 13/931
USPC ............................................... 296/1.04, 1.07
See application file for complete search history.

(56) References Cited

U.S. PATENT DOCUMENTS

| | | | |
|---|---|---|---|
| 6,227,501 B1 * | 5/2001 | Malcolm | B60R 19/483 248/27.3 |
| 6,729,429 B2 | 5/2004 | Takahashi | |
| 7,481,407 B2 | 1/2009 | Kim et al. | |
| 7,832,273 B2 * | 11/2010 | Schaaf | G01S 7/521 73/584 |
| 7,988,212 B2 | 8/2011 | Hartley et al. | |
| 8,014,921 B2 * | 9/2011 | Rao | B60R 21/0134 280/735 |
| 8,511,727 B2 | 8/2013 | Hartley et al. | |
| 8,690,206 B1 | 4/2014 | Yamasaki et al. | |
| 8,833,815 B2 | 9/2014 | Aleem et al. | |
| 9,004,578 B1 | 4/2015 | Ghannam et al. | |
| 9,132,791 B2 | 9/2015 | Yamasaki et al. | |
| 2005/0242933 A1 * | 11/2005 | Loh | B60R 19/483 340/435 |

* cited by examiner

*Primary Examiner* — Jason S Daniels
(74) *Attorney, Agent, or Firm* — Patents and Licensing LLC; Daniel W. Juffernbruch

(57) ABSTRACT

A bracket holds a limited field of view presence sensor module in a fixed, angled position for optimum sensing coverage area and enables the sensor module to be partially recessed in a surface orifice with respect to a mounting surface. The bracket can be installed from the outside to hold at least one radar sensor on the side of a long vehicle such as a truck, bus, recreational vehicle or the like for blind spot monitoring.

20 Claims, 19 Drawing Sheets

SENSOR BRACKET APPARATUS

TECHNICAL FIELD

The present inventions relate to the mounting of sensors to a surface and, more particularly, relate to the mounting of sensors which have a directionality of coverage area or limited field of view.

DESCRIPTION OF THE RELATED ART

The mounting of sensors must be done so that the sensing area is pointed towards the desired coverage area. In typical installations, the sensor is mounted in a fixed position with a clear view of the desired coverage area. The sensor is affixed, bolted, or screwed onto an existing fixed structure or onto simple brackets. The sensing area is cleared from obstructions to reduce false detections.

A simple mounting strategy is not feasible for all sensor installations. In some cases, sensors need to be hidden from view for security or aesthetic purposes. In other cases, sensors need to be recessed below a surface so that the sensors are not struck, so that they do not obstruct other devices in a system, or so that they are aerodynamic.

In the case of blind spot detection (BSD) and parking assist on vehicles such as passenger cars, radar sensors are located in the rear bumper area and are completely behind the bumper surface. Similarly, for forward collision warning systems, radar sensors are located in the front bumper area. The directionality of the sensor coverage area is perpendicular to the bumper surface. These locations are reasonable for vehicles, such as passenger cars.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Sensor modules cannot be mounted easily in all situations. In some cases, it is desired for the sensor to have a low profile to reduce possible impact or collision with other objects in the environment, to have good aerodynamics in the sensor area, or to reduce the visibility and awareness of the sensor's presence or existence. Some installations require the sensor to be completely hidden. For some cases, such as on the side of a vehicle for blind spot detection, it is desired for the sensor to sense ("look") along the side of the vehicle for maximum coverage but not protrude from the vehicle side such that the sensor would not be struck by other objects or would not be obstructed by the vehicle features such as door handles or curvatures which may affect the sensor measurements.

In order to support a variety of sensor mounting situations and requirements, a unique sensor module mounting bracket has been created. The mounting bracket holds sensor modules which consist of a sensor element surface, such as a patch antenna or sensing membrane, and electrical components which support the sensor functionality. The mounting bracket is particularly beneficial for sensor modules which have characteristics sufficient to sense a presence of an object within a limited field of view or with a directionality to the sensing coverage area. Examples of such type of sensor modules are radar and ultrasonic.

With adjustments to the main bracket design, as described herein, even more sensor mounting requirements can be met. The mounting bracket design may be utilized for other types of devices in addition to or besides sensor modules. An example of other types of devices is lights.

Figure 1:
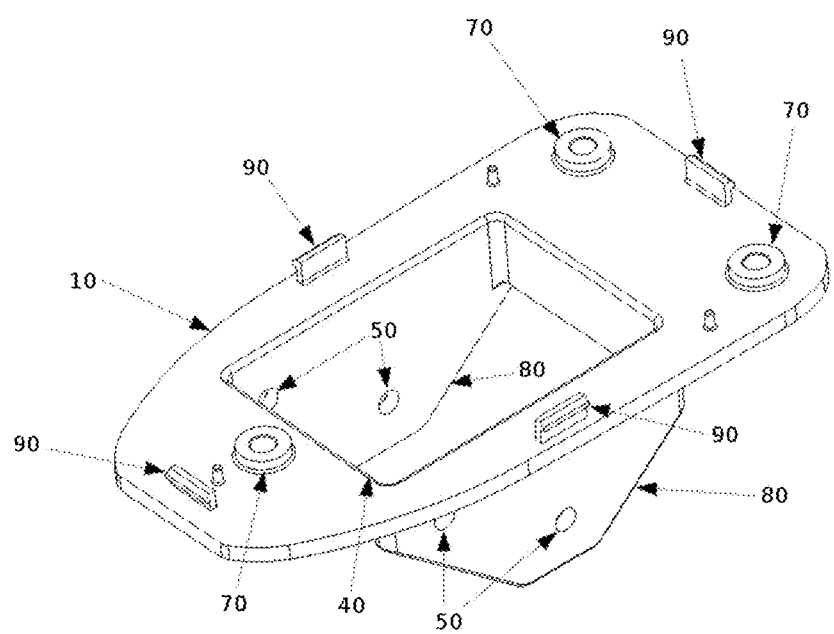
FIG. 1 illustrates a perspective view of an exemplary design of a mounting bracket apparatus according to embodiments of the present inventions.

FIG. 1 illustrates one preferred embodiment of the mounting bracket apparatus according to embodiments of the present inventions. As illustrated in FIG. 1, the mounting bracket apparatus has a main surface 10, a hole 40 in the center region of the bracket, a single or a multitude of mounting bosses 70, and clips 90 for attaching an optional cover 30, as referenced in FIG. 7. The bracket apparatus has a mounting arm 80 which is below the main surface 10. On the mounting arm 80 is a single or a multitude of mounting holes 50. The mounting arm may have two parallel sides with mounting holes 50 on each parallel side. The shape, size, and location of the mounting holes 50 are dependent upon the sensor housing mounting features and other requirements of the overall system.

Figure 2:
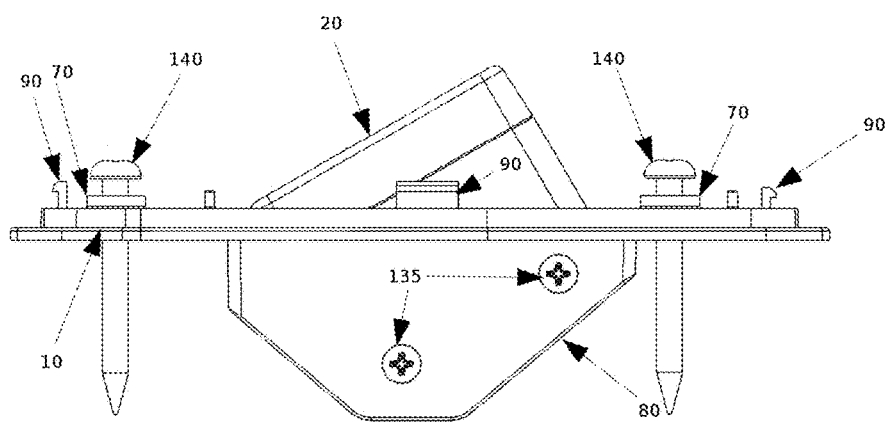
FIG. 2 illustrates a side view of a sensor module mounted within the bracket apparatus according to an exemplary embodiment of the present inventions.

FIG. 2 illustrates a side view of a sensor module mounted within the bracket apparatus. The sensor module 20 is assembled into the hole 40. The shape and dimensions of the hole 40 is dependent upon the sensor module 20 shape and dimensions and upon the desired orientation of the sensor module.

Figure 3:
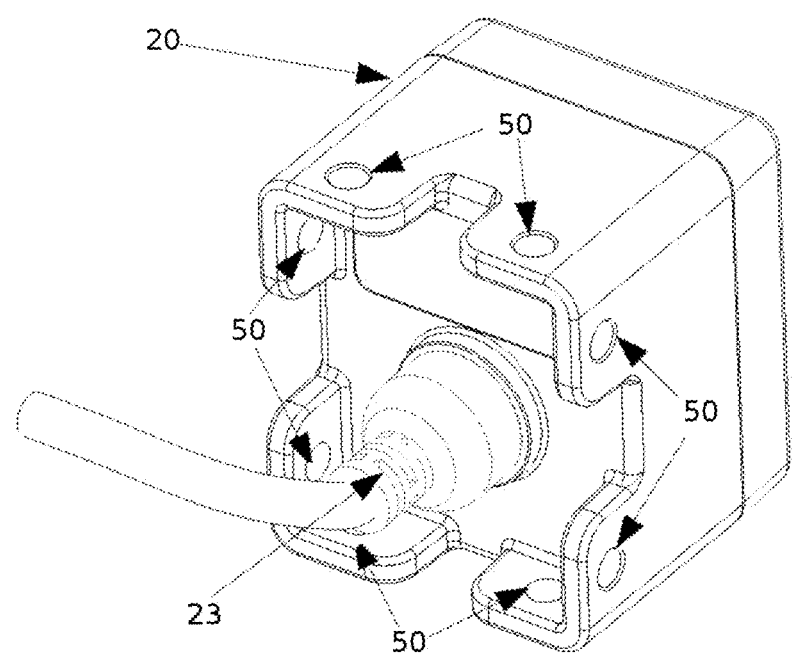
FIG. 3 illustrates a perspective view of an exemplary design of a sensor module housing mounting features according to embodiments of the present inventions.

An exemplary design of a sensor module housing mounting features is shown in the perspective view of FIG. 3. The sets of mounting holes 55 on the corners of the sensor module housing enables several different mounting orientations and methods. As shown in FIG. 2, one or more fasteners 135 may be placed through the mounting holes 50 of the bracket apparatus, as referenced in FIG. 1, and the mounting holes 55 of the sensor housing, as referenced in FIG. 3, to secure the sensor module. The recommended type of fasteners is bolts with lock nuts. Other types of fasteners may be used, such as cotter pins, screws, hex nuts, and wing nuts. The shapes, dimensions, and locations of the mounting holes 50 on the mounting bracket and the mounting holes 55 on the sensor module housing are dependent upon the specific design implementation of the mounting bracket and the sensor module. A coupling or connector 23 is on the back of the sensor module so that the sensor module can be electrically attached to or detached from a host system. In the preferred embodiment, a strain relief cable is assembled onto the sensor module housing, and a connector is at the end of the cable. For installation of the sensor module with mounting bracket onto a host system, the connector on the strain relief cable is attached to a mating connector on the host system. The strain relief cable enables easier installation and routing of the electrical connections between the sensor module and the host system. Alternatively, the coupling can be a connector directly attached to the sensor module housing, with no cable.

Figure 4:
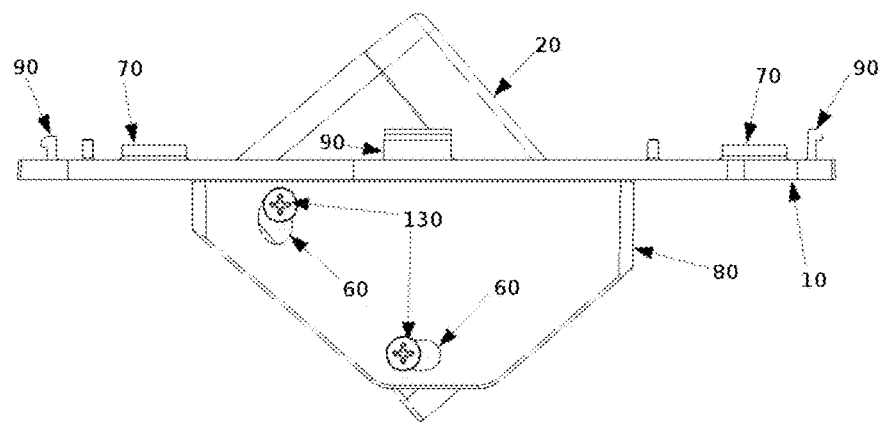
FIG. 4 illustrates a side view of an exemplary design of a mounting bracket apparatus which supports variable mounting angles of the sensor module according to embodiments of the present inventions.

FIG. 4 illustrates a side view of one preferred embodiment of the sensor module with mounting bracket apparatus which enables the sensor module to be mounted at variable angles. Instead of mounting holes, the bracket arms 80 have mounting slots 60 thereby allowing the sensor module 20 to be positioned at different angles and then locked into a particular angle by tightening fasteners 130 through the mounting slots 60 of the bracket apparatus and the sensor mounting holes 55, as referenced in FIG. 3. The recommended type of fasteners is bolts with lock nuts. Other types of fasteners may be used including screws, hex nuts, and wing nuts. The mounting slots 60 may be of varying lengths depending on how much mounting angle variation is needed. The sensor module may be orientated to face either end of the mounting bracket apparatus. This variable angle capability is especially useful during sensor system design and integration phases when tuning of the sensor system is conducted. If the sensor angle is desired to be non-variable after tuning, then a mounting bracket with fixed position mounting holes 50, as shown in FIG. 2, at the desired mounting hole locations may be used.

Figure 5:
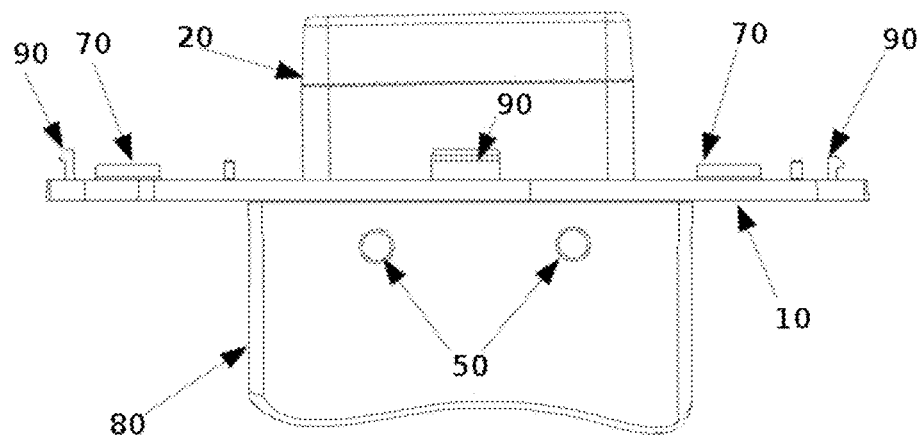
FIG. 5 illustrates a side view of a sensor module mounting height so that it protrudes in relation to the bracket surface according to embodiments of the present inventions.
Figure 6:
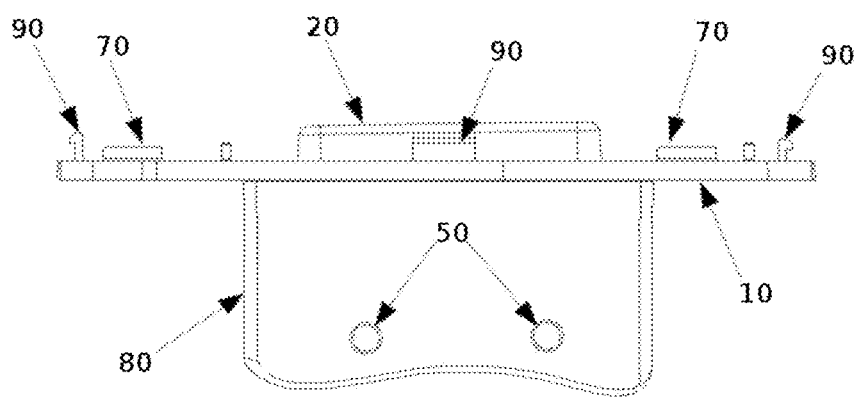
FIG. 6 illustrates a side view of a sensor module mounting height so that it is recessed in relation to the bracket surface according to embodiments of the present inventions.

FIG. 5 and FIG. 6 illustrate side views of a mounting bracket apparatus and method of supporting different mounting heights of the sensor module 20. Depending upon the mounting hole 50 locations on the mounting arm 80 of the bracket apparatus, a sensor module may be above the main surface 10, flush with the main surface 10, or below the main surface 10 of the mounting bracket apparatus. FIG. 5 shows the sensor module 20 with a mounting location above the main surface 10. FIG. 6 shows the sensor module 20 with a mounting location nearly flush with the main surface 10. FIG. 5 and FIG. 6 illustrate the embodiment of the sensor module 20 having a sensing directionality of perpendicular to the main surface of the mounting bracket assembly.

Figure 7:
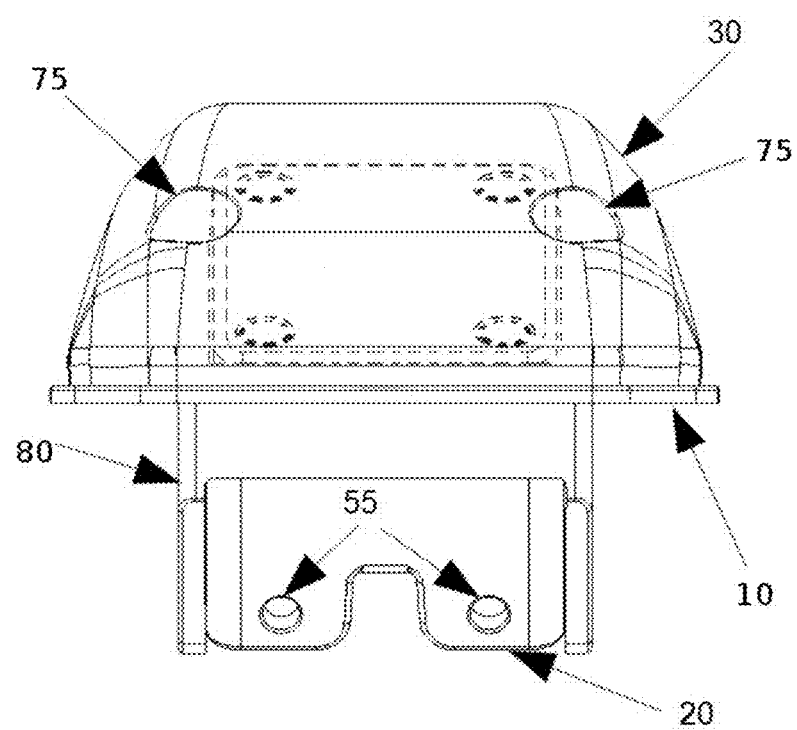
FIG. 7 illustrates a front view of a cover assembled to the mounting bracket according to an exemplary embodiment of the present inventions.
Figure 8:
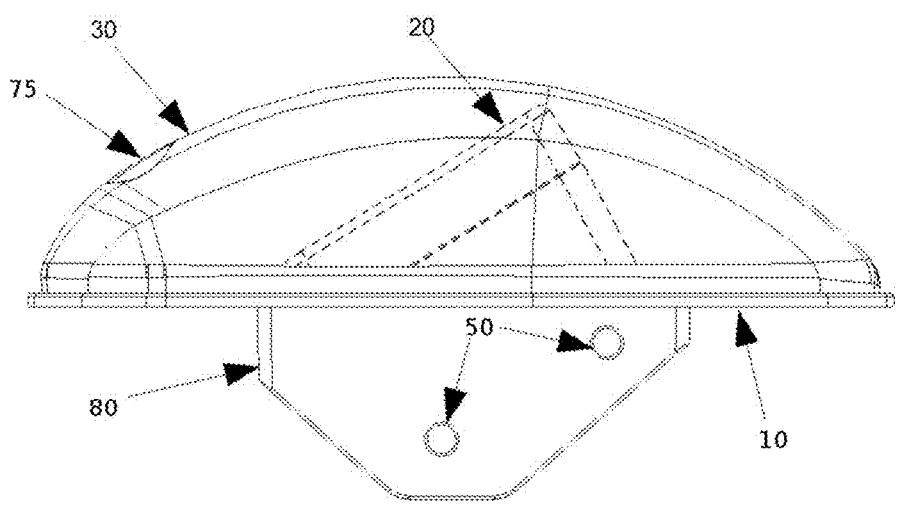
FIG. 8 illustrates a side view of a cover assembled to the mounting bracket according to an exemplary embodiment of the present inventions.
Figure 9:
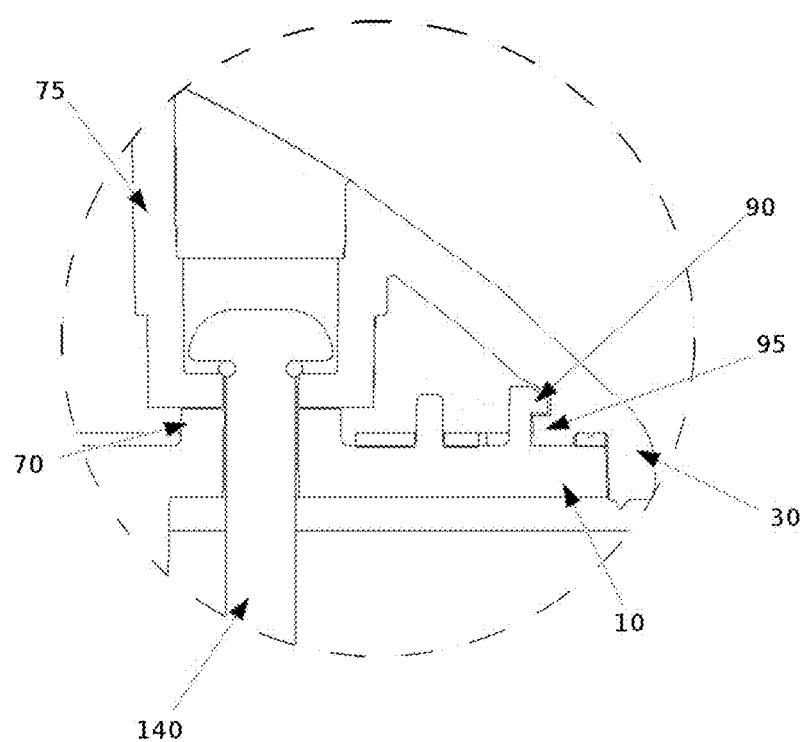
FIG. 9 illustrates a detailed drawing of a capture method between a cover and the mounting bracket according to an exemplary embodiment of the present inventions.

In one preferred embodiment according to the front view illustrated in FIG. 7 and the side view illustrated in FIG. 8, a cover 30 may be assembled onto the bracket 10. FIG. 7 shows a front view and FIG. 8 shows a side view of the cover assembled onto the mounting bracket apparatus. The cover is held in place by clips 90 on the bracket engaging with a corresponding clip receptacle 95 feature on the cover in the preferred embodiment, as shown in the detailed drawing of FIG. 9. Other capture methods may be used to secure the cover to the bracket including screws, bolts, hex nuts, and adhesives. The cover 30 may have mounting bosses 75 which are aligned with the mounting bosses 70 of the bracket apparatus, for easier assembly onto a surface of a host system. The cover 30 in the preferred embodiment has a low profile and is aerodynamic. The cover may be used to protect the sensor module from being struck by other objects and from environmental elements such as rain, snow, and ice. The cover 30 may be painted so that the assembled unit of the sensor module, mounting bracket, and cover blends in with the surface of the host system, as long as the paint material does not interfere with the sensing performance of the sensor module. The cover 30 may be other shapes and sizes depending upon the requirements for a sensor system installation.

Figure 10:
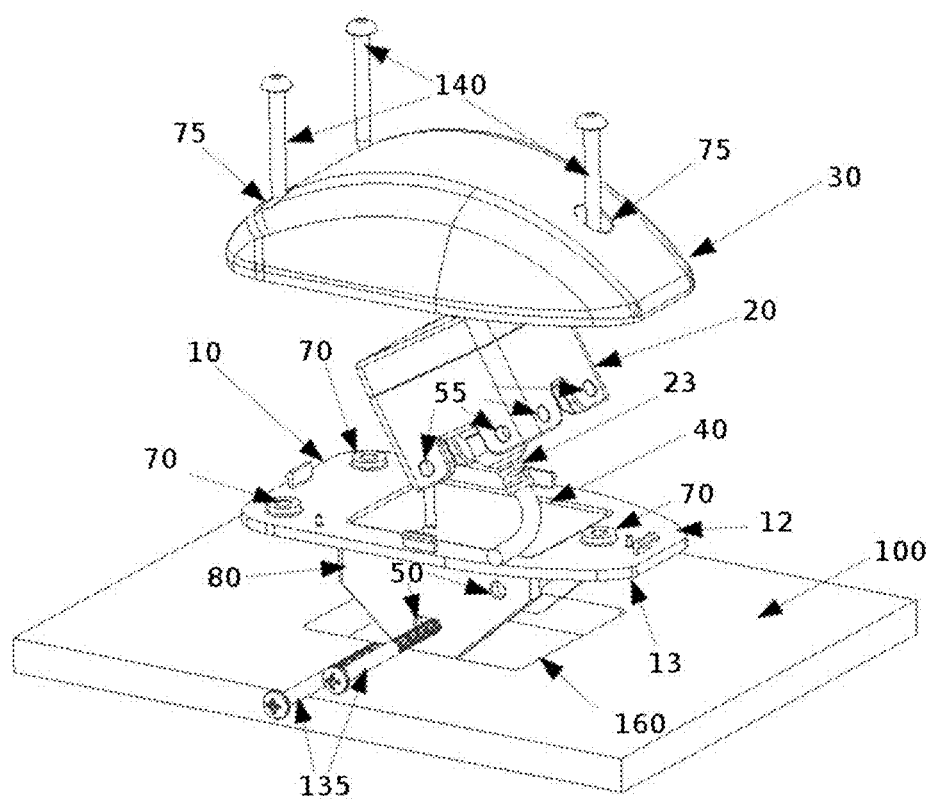
FIG. 10 illustrates an exploded assembly drawing of mounting a bracket, sensor, and cover assembly onto a surface according to embodiments of the present inventions.

In one preferred embodiment according to the exploded assembly drawing illustrated in FIG. 10, shows the assembly of a sensor module, mounting bracket, and cover onto a surface 100, which is parallel to the bracket main surface 10. The surface 100 is the surface of a host system, for example the side of a long vehicle. According to the steps for an installation method, first, the sensor module is assembled to the mounting bracket by inserting the sensor module 20 including a coupling or connector 23 into the mounting bracket hole 40, by aligning the sensor module mounting holes 55 with the bracket mounting holes 50 on the mounting arm 80, by inserting bolts 135 through the mounting holes 50 and 55, and by tightening the bolts with lock nuts to secure the sensor module to the mounting bracket. This first step can be omitted if the mounting bracket is manufactured integral to a housing of the sensor module. Second, the optional cover 30 is affixed to the mounting bracket as previously described and shown in FIG. 7, FIG. 8, and FIG. 9. This second step can be omitted if the cover is manufactured integral to the sensor module or mounting bracket. In order to affix the bracket to a surface, the surface 100 must have a surface orifice 160 to accept the below-surface features of the bracket, namely the mounting arm 80, and the lower portions of the sensor module 20, such as accessibility to the sensor module coupling or connector 23, depending upon the specific mounting implementation of the sensor module onto the mounting bracket apparatus. Third, the assembly of the sensor module, mounting bracket, and cover is positioned near the surface orifice 160 from the outside surface of the surface 100. Fourth, the sensor module is connected to the host system by feeding a cable or coupling through the surface orifice 160 and attaching the sensor module coupling or connector 23 to a corresponding coupling or connector on the host system from within the inside surface of the surface 100. Fifth, the assembly of the sensor module, mounting bracket, and cover is inserted into the surface orifice 160 and the mounting bracket bottom surface 13 is placed against the outside surface of the surface 100. Sixth, the assembly is secured to the surface 100 by inserting mounting screws 140 through the cover mounting bosses 75 and the bracket mounting bosses 70 and by screwing the screws into the surface 100. The type of mounting screws 140 is dependent upon the material of the surface 100. If the surface 100 is wood, fiberglass, or similar material, then wood screws may be used. If the surface 100 is metal, then sheet metal screws or bolts with nuts may be used. An additional advantage of mounting the sensor module with mounting bracket to the outside surface of the host system is easier access for maintenance and replacement purposes.

Passenger cars have lengths less than eighteen (18) feet (5.5 meters). Blind spot detection (BSD) sensors are typically tuned to have a coverage area for the width of the adjacent lane. For U.S. highways, the lane width is typically twelve (12) feet (3.6 meters). Therefore, sensors located in the rear bumper detect an approaching vehicle in the adjacent lane up to 12 feet (3.6 meters) away. The sensor continues to detect the approaching vehicle while the approaching vehicle passes the host vehicle and until the approaching vehicle's back bumper leaves the coverage area of the sensor. One sensor on the right rear bumper area and one sensor on the left rear bumper area provide reasonable blind spot detection coverage for passenger cars.

Long vehicles such as buses, tractor-trailers, and motor homes are typically about eighteen (18) feet (5.5 meters) or more in length. Large motor homes are up to forty-five (45) feet (13.7 meters) in length. Tractor-trailers can be about seventy (70) feet (21.3 meters) or more in length. One or more of the apparatus of the sensor with mounting bracket can be mounted on a side of and accommodate any of the above vehicle lengths. One sensor on each side of the rear area of the vehicle is not sufficient for blind spot detection (BSD) coverage. A passenger car in an adjacent lane can be to the side of the long vehicle and not be detected by a blind spot detection (BSD) sensor in the rear bumper area of the long vehicle. Multiple sensors are needed along the side of the long vehicle in order to cover the long vehicle's blind spot area.

Blind spot detection (BSD) sensors may be placed on the sides of a long vehicle so that the directionality of the coverage area is perpendicular to the sides of the vehicle, similar to that of sensors in the bumpers of passenger cars. In this case, several sensors would be needed to have sufficient coverage along the entire length of the long vehicle.

For long vehicles, it is desired to require fewer sensors while maintaining a long coverage area so that the sensor system cost and installation time are reduced. To achieve these goals, fewer sensors can be placed along the sides of the long vehicle at non-perpendicular angles to the vehicle walls. The sensors can protrude outside the vehicle walls and "look" along the sides of vehicle. The sensors may be pointed at different angles, depending upon the vehicle structure and desired coverage area. The sensors can still be mostly recessed into the vehicle walls so that the sensors are not struck by other objects and are flush, sealed, and aerodynamic.

The mounting bracket design of some embodiments of the present inventions holds the sensor module in a fixed position for optimum coverage area for the system and enables the sensor module to be mounted to a surface such that the sensor module may be recessed and may be at an angle to see alongside the length of the surface.

Figure 11:
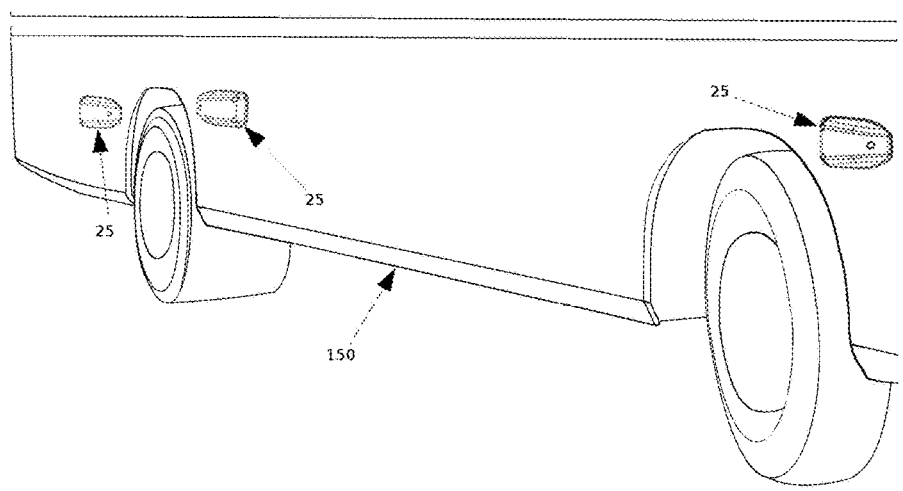
FIG. 11 illustrates a perspective view of multiple sensor modules with mounting brackets and covers at different positions installed on the side of a vehicle according to embodiments of the present inventions.

FIG. 11 illustrates a perspective view of multiple assembled units 25 installed on the side of a long vehicle. The assembled units 25 include the mounting bracket 10, sensor module 20, and optional cover 30, as shown in FIG. 10. The vehicle has a surface 150 which is predominantly flat. For each location on the vehicle at which a sensor module with mounting bracket is to be mounted, a surface orifice 160 as shown in FIG. 10 must be present to accept the below-surface features of the bracket apparatus, namely the mounting arm 80; the wire, cable, or coupling interface 23 to the sensor module 20; and possibly the bottom portions of the sensor module 20. In this preferred embodiment, three sensors are installed on the side of the vehicle. The front and rear sensors are pointed towards the rear of the vehicle. The middle sensor is pointed towards the front of the vehicle.

Each sensor assembly 25 may be positioned at the same or different angles in comparison to the other sensor assemblies. Each sensor assembly may be positioned at the same or different vertical heights, with respect to the ground, in comparison to the other sensors. The specific position of each sensor assembly may be influenced by other devices or features on the vehicle. With this method of sensor assembly mounting, the sensor assemblies may be unobtrusive and aerodynamic while maximizing coverage area and maintaining vehicle styling.

Figure 12:
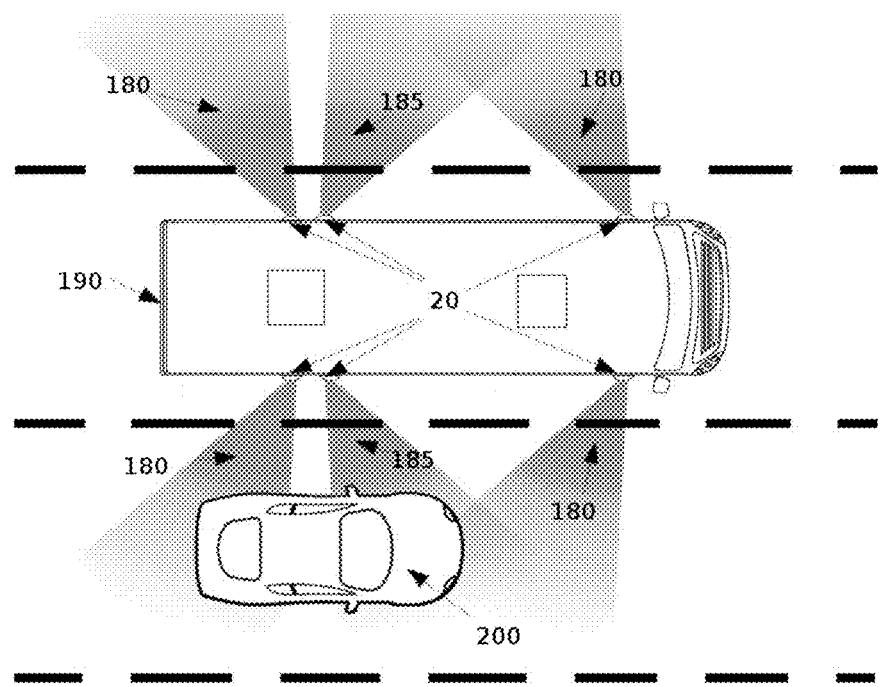
FIG. 12 illustrates a top view of a sensor system installation and corresponding coverage area of multiple sensor modules with mounting brackets and covers on a long vehicle according to embodiments of the present inventions.

FIG. 12 illustrates a top view of multiple assembled sensor units 25 installed on the sides of a long vehicle. The assembled sensor units at the front of the vehicle are positioned such that the sensors are pointing toward the back of the vehicle and therefore have a corresponding coverage area 180 which points backwards along the side of the vehicle. Similarly, the assembled units at the back of the vehicle are positioned such that the sensors are pointing toward the back of the vehicle and therefore have a corresponding coverage area 180 which points backwards. The assembled sensor units in the middle are positioned such that the sensors are pointing towards the front of the vehicle and therefore have a corresponding coverage area 185 which points forwards along the side of the vehicle. Depending upon each sensor's coverage area per its transmit and receive signal strengths and upon the distance between the installed front and middle assembled units, the coverage area 180 of the front assembled unit and the coverage area 185 of the middle assembled unit may overlap. The sensor modules are positioned within the brackets and tuned such that the coverage areas 180 and 185 are predominantly focused on the adjacent lane of traffic for blind spot detection. The variable angle of positioning within the mounting bracket as illustrated in FIG. 4 aids in the initial phase of system integration and tuning of the coverage area for installation onto a specific type and model of vehicle.

Figure 13:
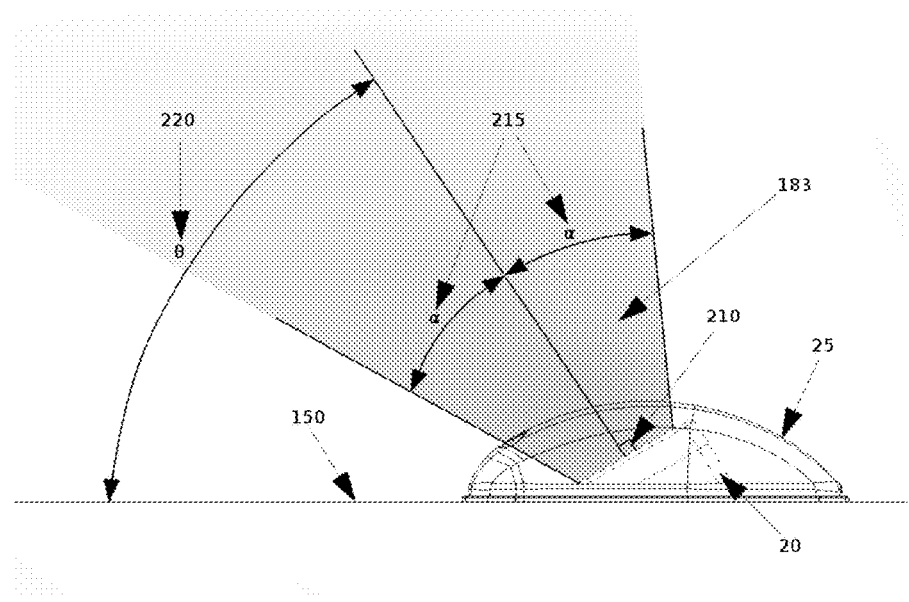
FIG. 13 illustrates the angles of sensor module with mounting bracket positioning with respect to the surface of a host system according to embodiments of the present inventions.

FIG. 13 illustrates the angles of sensor module with mounting bracket positioning with respect to the surface of a host system according to embodiments of the present inventions. In FIG. 13 as illustrated an assembled sensor unit 25 is installed on a host system. The sensor module 20 within the assembled unit 25 has an associated coverage area or limited field of view 183, shown in gray.

In one preferred embodiment, it is desired that $$\theta - \alpha \geq 0 \quad \text{(Equation 1)}$$

where:
$\theta$=angle from the plane of the surface of the host system to the middle of the coverage area 183;
$\alpha$=½ angular width of coverage area 183;
$\theta$ is also represented as the angle numbered 220; and
$\alpha$ is also represented as the angle number 215.

This angular relationship is desired so that coverage area 183 does not include the side of the host system, e.g. the side of a host vehicle, so that the outside and/or internal structures of the host system do not adversely affect the sensor measurements.

In order to achieve the angular relationship defined in Equation 1 and to view at least one adjacent traffic lane, in the preferred embodiment, the sensor module and mounting bracket are positioned accordingly with respect to each other and with respect to the outside surface of the vehicle. The sensor module has a limited field of view or coverage area 183 as shown in FIG. 13. The coverage area is shown bounded by two straight lines for illustration purposes; however, the actual coverage area typically has a tear drop shape. Because the sensor is able to detect the presence of objects, it is desired that the sensor module field of view does not include the outside or inside surface of the vehicle surface, so that the sensor measurements are not affected by the structure of the vehicle. In the preferred embodiment, the limited field of view is about a 40 degree beam width, that is, $\alpha$ is about 20 degrees, and $\theta$ is about 50 degrees, which results in $\theta-\alpha$ of about 30 degrees from the plane of the outer surface, nominally. The practical range of $\theta-\alpha$ is 15 degrees to 40 degrees, for a blind spot detection (BSD) sensor module.

The sensor module is angled, positioned, and assembled within the mounting bracket so that the sensing element surface 210, or antenna surface, of the sensor module faces externally and at an angle to achieve the desired $\theta-\alpha$. The sensor module is also positioned within the mounting bracket, so that when the sensor assembly is mounted to the outside surface of the vehicle, a portion of the sensor module extends beyond the outside surface of the vehicle and is able to see alongside a length of the surface without viewing the outside surface itself. For a blind spot detection (BSD) system, the sensor module with mounting bracket is installed onto the outside surface of the vehicle which is a plane that is parallel to the vehicle's direction of travel.

In one preferred embodiment according to that illustrated in FIG. 1, the bracket apparatus has an irregular oval outline. One end of the bracket is narrower than the other end. This visual difference in widths at the ends of the bracket eases the system installation process by giving the installer a visual indication for proper orientation of the bracket and sensor assembly.

Figure 14:
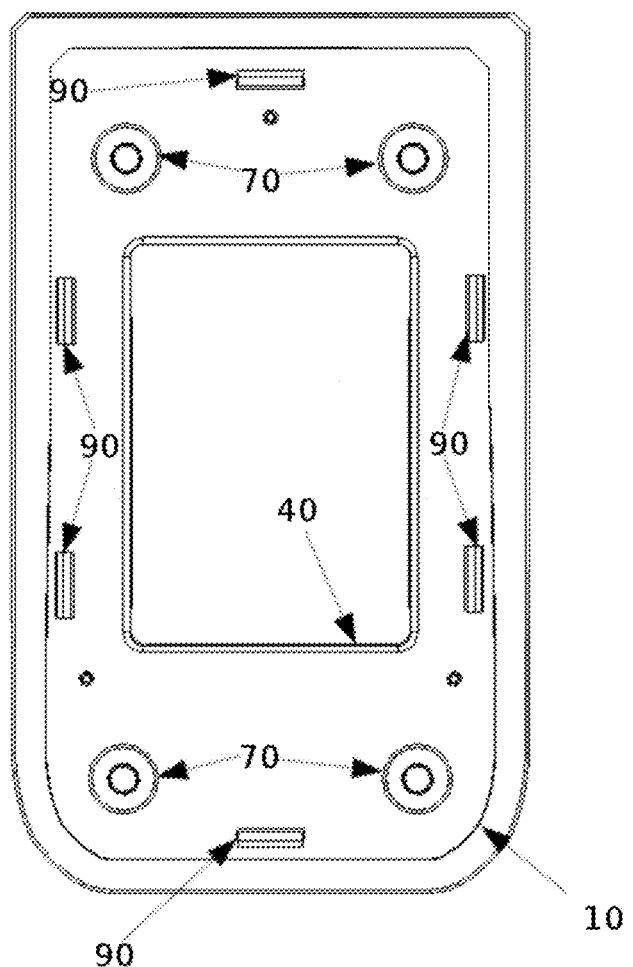
FIG. 14 illustrates a top view of an alternate exemplary design of a mounting bracket apparatus according to embodiments of the present inventions.

FIG. 14 illustrates a top view of an alternate embodiment of the bracket apparatus. For this example, the bracket has a rectangular shape. Otherwise, the bracket has similar functions as the preferred embodiment, with the ability to be mounted onto a flat surface, to support different mounting and orientation options for the sensor, and to support having covers attached.

Figure 15:
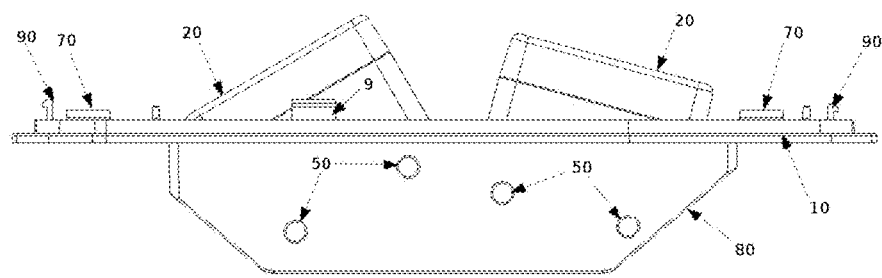
FIG. 15 illustrates a side view of an exemplary design of multiple sensor modules supported by a single bracket apparatus according to embodiments of the present inventions.

FIG. 15 illustrates a side view of an exemplary design of the bracket apparatus supporting multiple sensors. FIG. 15 specifically illustrates the support of two sensors 20 facing in opposite directions. As described previously for a single sensor, the support for multiple sensors may be such that each sensor is independent and mounted at different heights, angles, and orientations.

Figure 16:
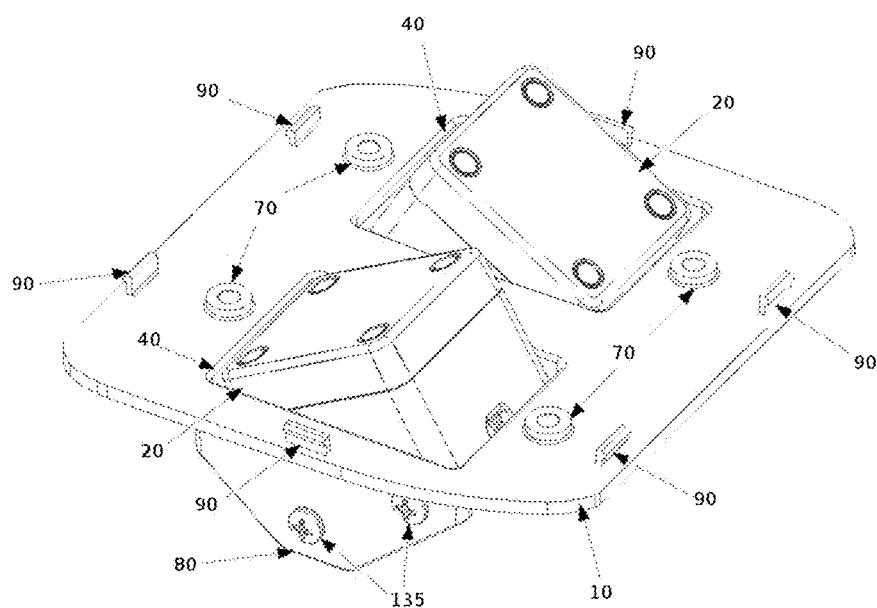
FIG. 16 illustrates a perspective view of an alternate exemplary design of multiple sensor modules supported by a single bracket apparatus according to embodiments of the present inventions.

FIG. 16 illustrates a perspective view of an alternate exemplary design of the bracket apparatus supporting multiple sensors. In this alternate design, the sensor modules 20 are placed side by side. Each sensor is independent and may be mounted at different heights, angles, and orientations. FIG. 16 shows the bracket apparatus with two sensor modules 20 placed side by side.

Figure 17:
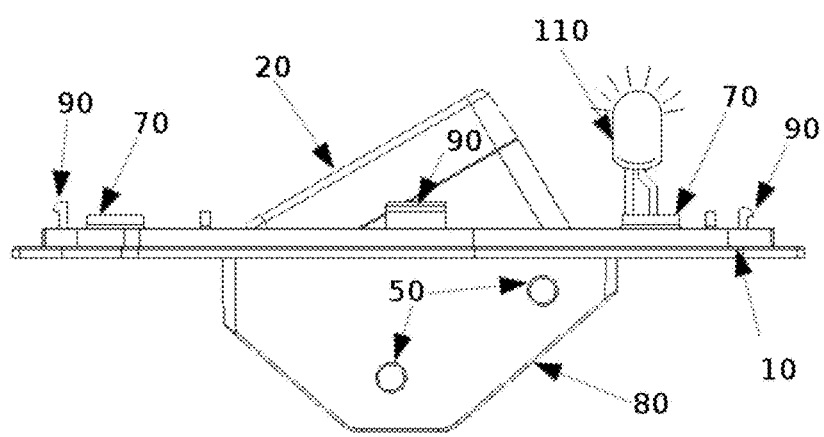
FIG. 17 illustrates a side view of an alternate exemplary design of a bracket apparatus which supports mounting other devices in addition to the sensor module according to embodiments of the present inventions.

FIG. 17 illustrates a side view of an alternate exemplary design of the bracket apparatus supporting a sensor module 20 and a lamp 110. The lamp may be associated with the functionality of the sensor module 20, for example, the lamp may be controlled by the sensor module 20 and turn on when the sensor detects an object of interest. The sensor module 20 may turn off the lamp when no object of interest is detected. In this case, the lamp functions as an indicator light for the sensor module detecting objects. Alternatively, the lamp 110 may function independently from the sensor 20. For example, the lamp may be a light or LED, such as a marker light on the side of a vehicle. If an optional cover 30 is installed onto the mounting bracket, the cover should be translucent in order to view the lamp 110. Instead of a lamp 110, the additional device on the bracket apparatus may be of a different type, such as another type of sensor.

Figure 18:
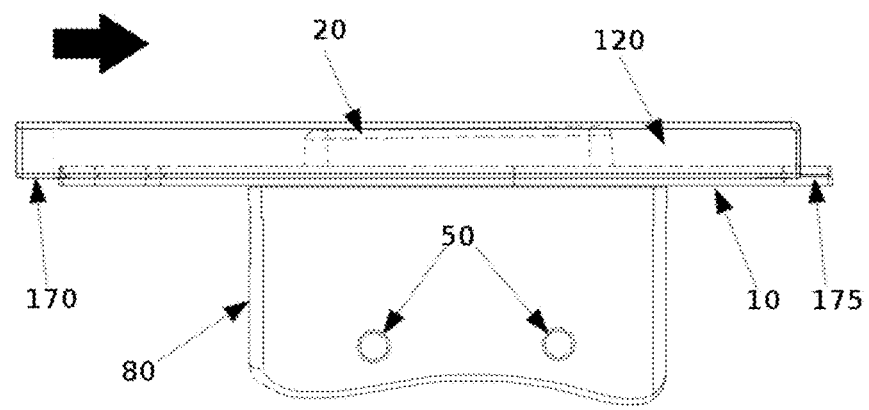
FIG. 18 illustrates a side view of a sliding cover assembled to the mounting bracket with the sensor module at least partially recessed below a surface according to an exemplary embodiment of the present inventions.

FIG. 18 illustrates a side view of an exemplary design of the bracket apparatus with the sensor module partially recessed and a flat cover 120 that slides onto the bracket from the edge for insertion and removal of the cover. The bracket 10 has a slide feature 175 which engages with a corresponding slide feature 170 on the cover 120. The cover may be held in place by using clips or by using mounting screws, which hold the cover in place when the bracket apparatus is secured to the host system.

Figure 19:
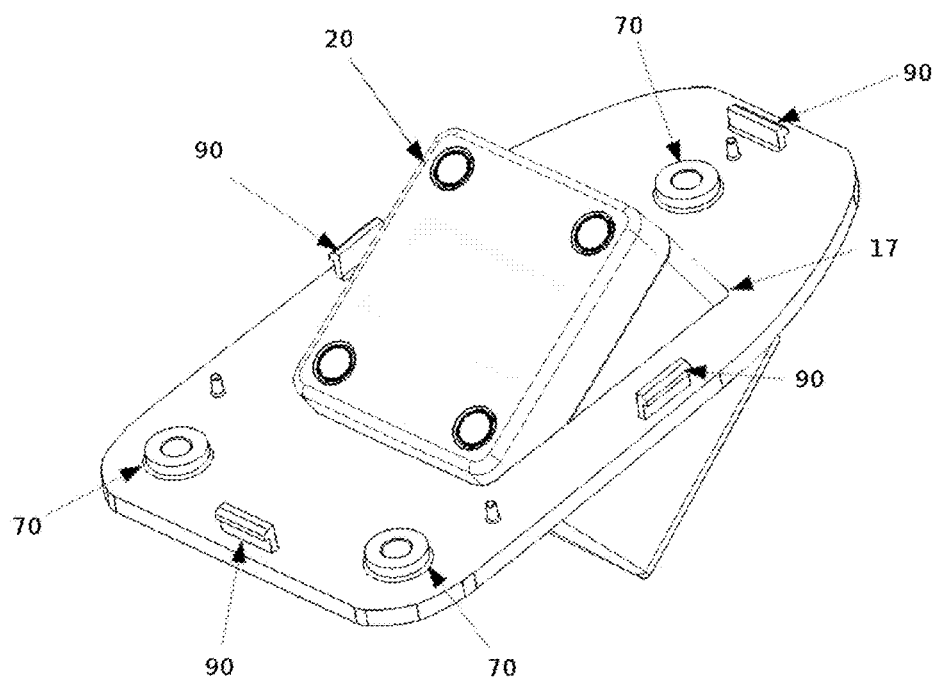
FIG. 19 illustrates a perspective view of a sensor module housing integrated with the mounting bracket according to an exemplary alternate embodiment of the present inventions.

FIG. 19 illustrates a perspective view an alternate embodiment with the mounting bracket and sensor module housing being an integrated apparatus 17. For example, the bracket may be molded onto the sensor housing as one integrated piece part instead of a separate piece part.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. In a vehicle having a side surface substantially parallel to a direction of travel of the vehicle with at least one sensor module of a type of sensor module having a limited field of view, the improvement comprising:
a mounting bracket configured to mount the sensor module to the side surface;
wherein the side surface has an interior surface and an exterior surface and comprises a surface orifice therethrough;
wherein the mounting bracket is configured to mount the sensor module to the side surface at the surface orifice; and
wherein the mounting bracket is configured to mount at least a portion of the sensor module positioned beyond the exterior surface to an extent necessary to see in a direction on the side surface alongside a direction of travel of the vehicle without viewing the exterior surface itself.

2. In the vehicle according to claim 1,
wherein the sensor module comprises a sensor element surface facing externally from the sensor module;
wherein the sensor module comprises electrical components internal to the sensor module; and
wherein the mounting bracket mounts the sensor module such that the sensor element surface of the sensor module extends beyond the exterior surface.

3. In the vehicle according to claim 1, wherein a middle of the field of view of the sensor module is in the direction alongside the side surface without viewing the side surface itself.

4. In the vehicle according to claim 1,
wherein the side surface is a side of a road vehicle;
wherein the mounting bracket comprises a cover protruding out from the side of the road vehicle and having an inner perimeter mounted flush against the side of the road vehicle;
wherein the mounting bracket positions the sensor module such that the limited field of view sees a blind spot to the side of the vehicle; and
wherein the limited field of view alongside a length of the side surface covers at least one adjacent lane on a road.

5. In the vehicle according to claim 1, wherein the mounting bracket is configured to install and attach to the exterior surface with at least a portion of the bracket extending into the surface orifice.

6. In the vehicle according to claim 1, wherein the mounting bracket is integral with the sensor module.

7. In the vehicle according to claim 1, wherein the sensor module comprises a radar sensor.

8. In the vehicle according to claim 1,
wherein the mounting bracket comprises a bracket substrate having a top bracket surface and an opposing bottom bracket surface;
wherein the bracket substrate comprises a hole in the bracket substrate of a size sufficiently large to accommodate the sensor module projecting through the hole; and
wherein the bracket substrate comprises a mechanism to adjustably hold the sensor module within the surface orifice projecting through the hole at a variably selected angle to a plane of the bracket substrate.

9. An apparatus comprising:
a sensor module with a mounting bracket;
wherein the mounting bracket is configured to mount the sensor module to a surface;
wherein the surface has an inside surface and an outside surface and comprises a surface orifice therethrough;
wherein the mounting bracket is configured to mount the sensor module to the surface at the surface orifice;
wherein the mounting bracket is configured to mount at least a portion of the sensor module positioned beyond the outside surface to an extent necessary to see alongside a length of the surface without viewing the outside surface itself;
wherein the sensor module comprises a type of sensor module having a limited field of view:
wherein the mounting bracket is configured to mount the sensor module at an angle sufficient for the limited field of view to extend beyond the outside surface and see alongside the length of the surface without viewing the outside surface itself; and
wherein the mounting bracket mounts a plurality of sensor modules angled at different angles.

10. An apparatus comprising:
a sensor module with a mounting bracket;
wherein the mounting bracket is configured to mount the sensor module to a surface;
wherein the surface has an inside surface and an outside surface and comprises a surface orifice therethrough;
wherein the mounting bracket is configured to mount the sensor module to the surface at the surface orifice;
wherein the mounting bracket is configured to mount at least a portion of the sensor module positioned beyond the outside surface to an extent necessary to see alongside a length of the surface without viewing the outside surface itself;
wherein the sensor module comprises a type of sensor module having a limited field of view;
wherein the mounting bracket is configured to mount the sensor module at an angle sufficient for the limited field of view to extend beyond the outside surface and see alongside the length of the surface without viewing the outside surface itself; and
wherein the mounting bracket comprises a bracket substrate having a top bracket surface and an opposing bottom bracket surface; and
wherein the sensor module with a mounting bracket further comprises a cover attached over the top surface of the bracket substrate and covering at least the sensor module.

11. An apparatus comprising the sensor module with the mounting bracket according to claim 10, further comprising snap-fit tabs on the top surface of the bracket substrate to attach the cover to the bracket substrate.

12. An apparatus comprising the sensor module with the mounting bracket according to claim 10,
wherein the cover comprises first slide tracks; and
wherein the bracket further comprises second slide tracks on the top surface of the bracket substrate compatible with the first slide tracks to attach the cover to the bracket substrate.

13. An apparatus comprising:
a sensor module with a mounting bracket;
wherein the mounting bracket is configured to mount the sensor module to a surface;
wherein the surface has an inside surface and an outside surface and comprises a surface orifice therethrough;
wherein the mounting bracket is configured to mount the sensor module to the surface at the surface orifice;

wherein the mounting bracket is configured to mount at least a portion of the sensor module positioned beyond the outside surface to an extent necessary to see alongside a length of the surface without viewing the outside surface itself;

wherein the sensor module comprises a type of sensor module having a limited field of view;

wherein the mounting bracket is configured to mount the sensor module at an angle sufficient for the limited field of view to extend beyond the outside surface and see alongside the length of the surface without viewing the outside surface itself;

wherein the mounting bracket comprises a bracket substrate having a top bracket surface and an opposing bottom bracket surface; and wherein the mounting bracket further comprises a lamp attached to the bracket substrate to project light at least away from the top surface.

14. An apparatus comprising the sensor module with the mounting bracket according to claim 13, wherein the cover comprises a translucent cover attached over the top surface of the bracket substrate and covering at least the sensor module and the lamp.

15. An apparatus comprising:
a sensor module with a mounting bracket;
wherein the mounting bracket is configured to mount the sensor module to a surface;
wherein the surface has an inside surface and an outside surface and comprises a surface orifice therethrough;
wherein the mounting bracket is configured to mount the sensor module to the surface at the surface orifice;
wherein the mounting bracket is configured to mount at least a portion of the sensor module positioned beyond the outside surface to an extent necessary to see alongside a length of the surface without viewing the outside surface itself;
wherein the sensor module comprises a type of sensor module having a limited field of view; and
wherein the mounting bracket is configured to mount the sensor module at an angle sufficient for the limited field of view to extend beyond the outside surface and see alongside the length of the surface without viewing the outside surface itself; and
wherein the mounting bracket comprises a bracket substrate having a top bracket surface and an opposing bottom bracket surface;
wherein the bracket substrate comprises a hole in the bracket substrate of a size sufficiently large to accommodate the sensor module projecting through the hole;
wherein the bracket substrate comprises at least one side arm angled off of the bracket substrate for holding the sensor module within the surface orifice projecting through the hole at an angle to a plane of the bracket substrate; and
wherein the at least one side arm comprises a curved slot and the sensor module comprises a fastener fit into the curved slot to adjustably slide and fasten within the curved slot at a variably selected angle position.

16. A vehicle comprising:
a side surface substantially parallel to a direction of travel of the vehicle, wherein a length of the side surface is at least 18 feet (5.5 meters), and wherein the side surface has an interior surface and an exterior surface and comprises a plurality of surface orifices therethrough; and
a plurality of sensor modules with mounting brackets attached to the exterior surface of the side surface at respective ones of the surface orifices;
wherein the sensor modules comprise types of sensor modules having a limited field of view; and
wherein at least two of the mounting brackets mount at least a portion of respective sensor modules positioned beyond the exterior surface of the side surface at the respective ones of surface orifices for the limited field of view extending beyond the exterior surface to an extent necessary to see in a direction on the side surface alongside a direction of travel of the vehicle without viewing the exterior surface itself.

17. The vehicle according to claim 16, wherein a middle of the field of view of the sensor module is in the direction alongside the side surface without viewing the exterior surface itself.

18. A method of installing in a vehicle an apparatus comprising a sensor module with a mounting bracket on a side surface substantially parallel to a direction of travel of the vehicle, wherein the side surface has an interior surface and an exterior surface and comprises a surface orifice therethrough, comprising the steps of:
(a) first, approaching the side surface from the exterior surface;
(b) second, feeding at least a coupling associated with the sensor module through the surface orifice; and
(c) third, mounting the sensor module with the mounting bracket to the exterior surface of the surface,
wherein the mounting bracket mounts the sensor module to the side surface at the surface orifice;
wherein the mounting bracket mounts at least a portion of the sensor module positioned beyond a plane of the side surface to an extent necessary to see alongside a length of the side surface;
wherein the sensor module comprises a type of sensor module having a limited field of view; and
wherein the mounting bracket mounts the sensor module at an angle sufficient for the limited field of view to extend beyond the exterior surface and see in a direction on the side surface alongside a direction of travel of the vehicle without viewing the exterior surface itself.

19. The method according to claim 18, wherein the sensor module is mounted in said step (c) with a middle of the field of view of the sensor module in the direction alongside the side surface without viewing the exterior surface itself.

20. An apparatus comprising:
a sensor module with a mounting bracket;
wherein the mounting bracket is configured to mount the sensor module to a surface;
wherein the surface has an inside surface and an outside surface and comprises a surface orifice therethrough;
wherein the mounting bracket is configured to mount the sensor module to the surface at the surface orifice;
wherein the mounting bracket is configured to mount at least a portion of the sensor module positioned beyond the outside surface to an extent necessary to see alongside a length of the surface without viewing the outside surface itself;
wherein the sensor module comprises a type of sensor module having a limited field of view;
wherein the mounting bracket is configured to mount the sensor module at an angle; and
wherein the mounting bracket mounts a plurality of sensor modules angled at different angles.

* * * * *